(12) United States Patent
Zhao et al.

(10) Patent No.: US 8,821,773 B2
(45) Date of Patent: Sep. 2, 2014

(54) GRAPHENE COMPOSITE ELECTRODES FOR ENERGY STORAGE DEVICES

(76) Inventors: Xin Zhao, Wappingers Falls, NY (US); Yu-Ming Lin, West Harrison, NY (US)

( * ) Notice: Subject to any disclaimer, the term of this patent is extended or adjusted under 35 U.S.C. 154(b) by 140 days.

(21) Appl. No.: 13/553,846

(22) Filed: Jul. 20, 2012

(65) Prior Publication Data

US 2014/0022700 A1 Jan. 23, 2014

(51) Int. Cl.
*C23C 16/01* (2006.01)

(52) U.S. Cl.
USPC .............................. 264/81; 264/104; 264/105

(58) Field of Classification Search
None
See application file for complete search history.

(56) References Cited

U.S. PATENT DOCUMENTS

| | | | | |
|---|---|---|---|---|
| 8,557,442 | B2 * | 10/2013 | Liu et al. | 429/231.5 |
| 2011/0091647 | A1 | 4/2011 | Colombo et al. | |
| 2011/0292570 | A1 * | 12/2011 | Ivanovici et al. | 361/502 |
| 2013/0344392 | A1 * | 12/2013 | Huang et al. | 429/231.8 |

OTHER PUBLICATIONS

S. Yang et al., "Fabrication of Graphene-Encapsulated Oxide Nanoparticles: Towards High-Performance Anode Materials for Lithium Storage," Angewandte Chemie, 2010, pp. 1-5, vol. 49, Wiley-VCH Verlag GmbH, Weinheim, Germany.
P. Jampani et al., "Advancing the Supercapacitor Materials and Technology Frontier for Improving Power Quality," The Electrochemical Society Interface, Fall 2010, pp. 57-62, The Electrochemical Society, USA.
W. Zhou et al., "A general strategy toward graphene@metal oxide core-shell nanostructures for high-performance lithium storage," Energy & Environmental Science, 2011, pp. 4954-4961, vol. 4, The Royal Society of Chemistry, UK.
Y-S He et al., "A novel bath lily-like graphene sheet-wrapped nano-Si composite as a high performance anode material for Li-ion batteries," RSC Advances, 2011, pp. 958-960, vol. 1, Royal Society of Chemistry, UK.
X. Li et al., "Large-Area Sythesis of High-Quality and Uniform Graphene Films on Copper Foils," Science, 2009, pp. 1312-1314, vol. 324, American Association for the Advancement of Science, USA.

* cited by examiner

*Primary Examiner* — Mary F Theisen

(57) ABSTRACT

Aspects of the invention are directed to a method for forming a graphene composite structure. Initially, an encapsulating film is formed on a substrate. The encapsulating film comprises graphene. Subsequently, a plurality of particles are deposited on the encapsulating film, and then a temporary layer is deposited on the plurality of active particles and the encapsulating film. The substrate is then removed. Lastly, the temporary layer is also removed so as to cause the plurality of particles to form a cluster that is at least partially encapsulated by the encapsulating film.

21 Claims, 5 Drawing Sheets

GRAPHENE COMPOSITE ELECTRODES FOR ENERGY STORAGE DEVICES

FIELD OF THE INVENTION

The present invention relates generally to energy storage devices, and, more particularly, to graphene-based composites for use in the electrodes of energy storage devices such as batteries and supercapacitors.

BACKGROUND OF THE INVENTION

The pressing need for advanced battery technologies constitutes the driving force in developing new electrode formulations to replace conventional intercalation compounds and carbonaceous materials in current lithium-ion batteries. Electrochemically active metals and metalloids that can form intermetallic alloys with lithium, such as silicon, germanium, and tin, as well as transition metal oxides that can react with lithium ions reversibly via conversion reactions, such as tin dioxide, iron oxide, and manganese dioxide, have great potential to radically boost the energy density of lithium-ion batteries. Nevertheless, despite their promise as electrode materials, remarkable volumetric expansion/contraction may occur in these materials during charge/discharge cycling as a result of the lithiation/de-lithiation processes. These large volumetric changes often result in pulverization of the electrode materials. Once fragmented in this manner, side reactions may then occur at the freshly formed electrode/electrolyte interfaces, and the electrode fragments may become isolated by the newly formed side products and lose electrical contact. These unwanted side reactions gradually deplete the available electrolyte, and severely hinder the rate capability and deep cycling ability of the electrodes. By reducing particle size and dispersing the electrode materials into high content conducting additives and polymer binders, such issues with pulverization can be partially addressed at the expense of tapped density, overall capacity, and energy density of the resultant devices.

Incorporating graphene sheets into the high-capacity active materials offers an alternative solution to suppress the detrimental effects of volumetric variation, although this technology is not admitted as prior art with respect to aspects of the present invention by its discussion in this Background Section. A graphene composite electrode 100 employing graphene platelets formed from the exfoliation or the separation of graphite flakes is shown in FIG. 1. Here, graphene platelets 110 are distributed among electrochemically active nanoparticles 120 in a polymer binder 130. In such a system, the graphene platelets 110 help to accommodate lithium ion insertion/extraction stress during cycling and also supply the necessary electrical conductivity. That said, the preparation of uniform graphene composites remains a major challenge in designing desirable electrode systems, and the reinforcing effect from graphene platelets in such composites is far below what has been envisioned. Such electrode systems, for example, suffer from a strong tendency towards phase segregation, and graphene quality and morphology are typically difficult to control. In addition, the electrochemically active nanoparticles are prone to detachment from the graphene platelets and to re-agglomeration during cycling because of non-intimate contact at the graphene/active material interfaces.

Graphene oxide (GO), the oxidized form of graphene that may be obtained through treatment of graphite powder with oxidizing agents, has also been investigated as an electrode additive because of its excellent surface functionality and reactivity. Researchers have synthesized metal and oxide electrochemically active nanoparticles partially encapsulated by GO sheets by, for example, generating opposite surface charges and electrostatic attraction at the interface between the GO and nanoparticles, although, again, this technology is not admitted as prior art by its mention in this Background Section. In this manner, improved electrochemical performance has been demonstrated after reducing GO to restore the aromatic carbon networks. However, the GO-based structures remain highly defective and resistive even after reduction, which is not optimal for high-performance energy storage (e.g., battery) applications.

For the foregoing reasons, there is a need for alternative electrode technologies for use in high-performance energy storage devices such as batteries and supercapacitors that do not suffer from the several disadvantages described above.

SUMMARY OF THE INVENTION

Embodiments of the present invention address the above-identified needs by providing novel three-dimensional graphene composite electrode structures for high-performance energy storage devices.

Aspects of the invention are directed to a method for forming a graphene composite structure. Initially, an encapsulating film is formed on a substrate. The encapsulating film comprises graphene. Subsequently, a plurality of particles are deposited on the encapsulating film, and then a temporary layer is deposited on the plurality of active particles and the encapsulating film. The substrate is then removed. Lastly, the temporary layer is also removed so as to cause the plurality of particles to form a cluster that is at least partially encapsulated by the encapsulating film.

Additional aspects of the invention are directed at an article of manufacture. The article of manufacture is formed by performing several steps. Initially, an encapsulating film is formed on a substrate. The encapsulating film comprises graphene. Subsequently, a plurality of particles are deposited on the encapsulating film, and then a temporary layer is deposited on the plurality of active particles and the encapsulating film. The substrate is then removed. Lastly, the temporary layer is also removed so as to cause the plurality of particles to form a cluster that is at least partially encapsulated by the encapsulating film.

Other aspects of the invention are directed to another article of manufacture. Here, the article of manufacture comprises an encapsulating film and a plurality of particles. The encapsulating film comprises graphene. The plurality of particles form a cluster. The cluster is at least partially encapsulated by the encapsulating film.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
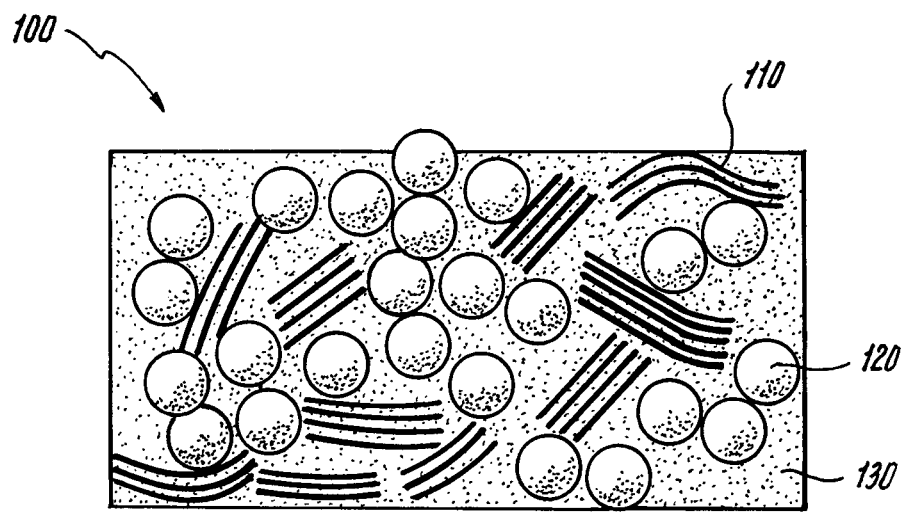
FIG. 1 shows a diagrammatic representation of a portion of a composite electrode formed with graphene platelets.
Figure 2:
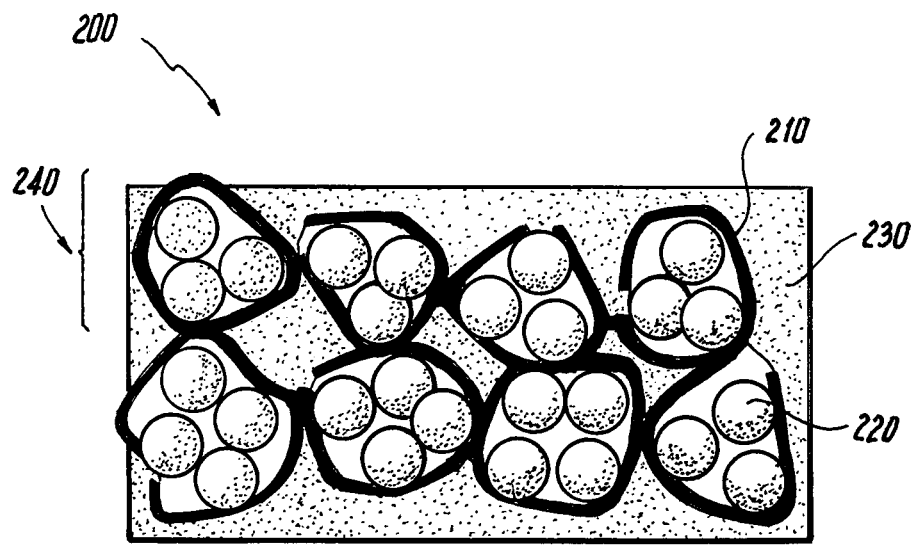
FIG. 2 shows a diagrammatic representation of a portion of a composite electrode in accordance with an illustrative embodiment of the invention.

FIG. 2 shows a diagrammatic representation of a portion of a composite electrode 200 in accordance with an illustrative embodiment of the invention. The composite electrode 200 comprises three primary constituents, namely, encapsulating films 210, active particles 220, and a binder 230. The active particles 220 form tightly packed clusters. Each of the clusters, in turn, is at least partially encapsulated (i.e., wrapped or covered) by a respective one of the encapsulating films 210 to form a respective capsule 240 (shown in the figure with the frontal portions of the encapsulating films 210 made transparent to display the encapsulated clusters within). The capsules 240 are bound together by the surrounding binder 230.

The encapsulating films 210 in the composite electrode 200 comprise graphene. Graphene substantially consists of a one-atomic-layer-thick sheet of $sp^2$-hybridized carbon. High quality graphene has been formed by the repeated mechanical exfoliation of graphite (i.e., micro-mechanical alleviation of graphite) since about 2004. In addition, graphene may also be synthesized by chemical vapor deposition (CVD). U.S. Patent Publication No. 2011/0091647, to Colombo et al. and entitled "Graphene Synthesis by Chemical Vapor Deposition," hereby incorporated by reference herein, for example teaches the CVD of graphene on metal and dielectric substrates using hydrogen and methane in an otherwise largely conventional CVD tube furnace reactor. Graphene CVD has been demonstrated by, for example, loading a metal substrate into a CVD tube furnace and introducing hydrogen gas at a rate between 1 to 100 standard cubic centimeters per minute (sccm) while heating the substrate to a temperature between 400 degrees Celsius (° C.) and 1,400° C. These conditions are maintained for a duration of time between 0.1 to 60 minutes. Next methane is introduced into the CVD tube furnace at a flow rate between 1 to 5,000 sccm at between 10 mTorr to 780 Torr of pressure while reducing the flow rate of hydrogen gas to less than 10 sccm. Graphene is thereby synthesized on the metal substrate over a period of time between 0.001 to 10 minutes following the introduction of the methane. The same reference also teaches that the size of CVD graphene sheets (i.e., size of CVD graphene domains) may be controlled by varying CVD growth parameters such as temperature, methane flow rate, and methane partial pressure.

For applications related to energy storage, the active particles 220 preferably comprise: an electrochemically active metal (or metalloid) that can form intermetallic alloys with lithium; a transition metal oxide or conducting polymeric material that can react with lithium reversibly via conversion reactions; or an intercalation material or compound that can host lithium ions in the lattice. Suitable electrochemically active metals include, but are not limited to, silicon (Si), germanium (Ge), and tin (Sn). Suitable transition metal oxides include, but are not limited to, tin dioxide ($SnO_2$), iron oxide ($Fe_xO_y$) and manganese dioxide ($MnO_2$). Suitable conducting polymeric materials include, but are not limited to, polyaniline (PANi), polypyrrole (PPy), and poly(3,4-ethylenedioxythiophene) (PEDOT). Suitable intercalation materials include, but are not limited to, graphite, lithium metal phosphates such as lithium iron phosphate ($LiFePO_4$) and lithium manganese phosphate ($LiMnPO_4$), and lithium metal oxides such as lithium cobalt oxide ($LiCoO_2$), lithium manganese oxide ($LiMn_2O_4$), lithium nickel oxide ($LiNiO_2$), and lithium nickel manganese cobalt oxide ($Li(Li_aNi_bMn_cCo_d)O_2$). In the illustrative embodiment shown in FIG. 2, the active particles 220 are spherical, but other suitable morphologies or combinations of morphologies may also be utilized (e.g., rods, pills, sheets, faceted shapes). The spherical active particles 220 may have diameters between about ten nanometers and about ten micrometers, although this range is again only illustrative and dimensions outside this range would still come within the scope of the invention. Suitable active particles 220 are available from a number of commercial sources including US Research Nanomaterials, Inc. (Houston, Tex., USA).

Lastly, the binder 230 in the exemplary composite electrode 200 preferably comprises a polymeric material such as, but not limited to, poly(vinylidene fluoride) (PVDF) or poly(acrylic acid) (PAA). Both materials can be sourced from commercial vendors such as Sigma-Aldrich (St. Louis, Mo., USA).

FIGS. 3A-3G show diagrammatic representations of intermediate structures in an exemplary processing sequence (i.e., exemplary method) in accordance with aspects of the invention capable of forming the composite electrode 200 shown in FIG. 2. Advantageously, while the sequence of steps and the ultimate product are entirely novel, the exemplary processing sequence utilizes several fabrication techniques (e.g., CVD, spray coating, dip coating, spin coating, baking, wet chemical etching, centrifugation, freeze drying, etc.) that will already be familiar to one having ordinary skill in, for example, the semiconductor and nanotechnology fabrication arts. Many of these conventional fabrication techniques are also described in readily available publications, such as: W. Choi, et al., *Graphene: Synthesis and Applications*, CRC Press, 2011; E. Tsotsas et al., *Modern Drying Technology: Product Quality and Formulation*, John Wiley & Sons, 2011; D. B. Mitzi, *Solution Processing of Inorganic Materials*, John Wiley & Sons, 2009; and M. Kohler, *Etching in Microsystem Technology*, John Wiley & Sons, 2008, which are all hereby incorporated by reference herein. The conventional nature of many of the fabrication techniques further facilitates the use of largely conventional and readily available tooling.

Figure 3A:
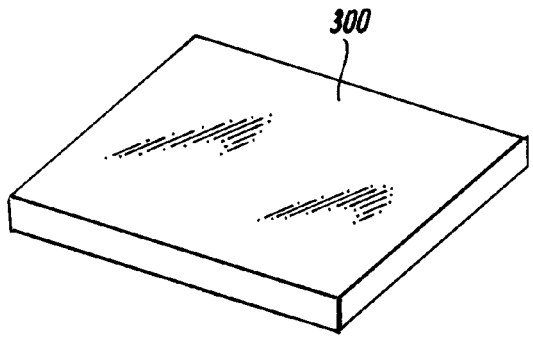
FIGS. 3A-3G show diagrammatic representations of intermediate structures in a method in accordance with an illustrative embodiment of the invention for forming the FIG. 2 composite electrode.
Figure 3B:
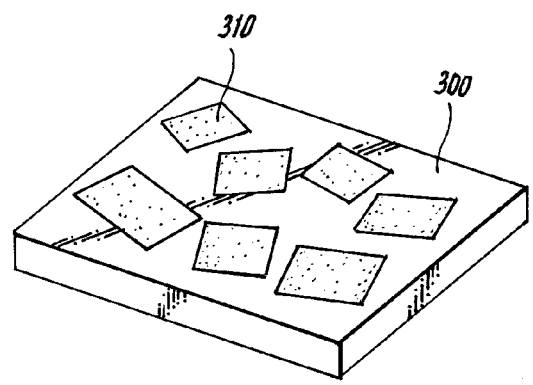

The exemplary method starts in FIG. 3A with a bare substrate 300. In this particular embodiment, the substrate 300 comprises copper (Cu) or nickel (Ni), but other equally suitable substrates may also be utilized. The substrate 300 is, in turn, exposed to graphene synthesis. The graphene may, for example, be formed by CVD, as detailed above. After this processing, several graphene encapsulating films 310 are present on the surface of the substrate 300, as shown in FIG. 3B.

Subsequent processing causes active particles 320 to be deposited on the graphene encapsulating films 310. As was detailed above, the active particles 320 may comprise, as just a few examples, a metal (or metalloid), a transition metal oxide, a lithium metal phosphate, a lithium metal oxide, or a conductive polymer. Deposition of the active particles 320 onto the graphene encapsulating films 310 may be by, for example, spray coating or dip coating in a suitable solvent. Suitable solvents can be, but are not limited to, water, ethanol, isopropanol, tetrahydrofuran (THF), and N-methyl-2-pyrrolidone (NMP). After the solvent is allowed to evaporate, the active particles 320 remain behind on the surface of the encapsulating films 310, as shown in FIG. 3C.

Figure 3C:
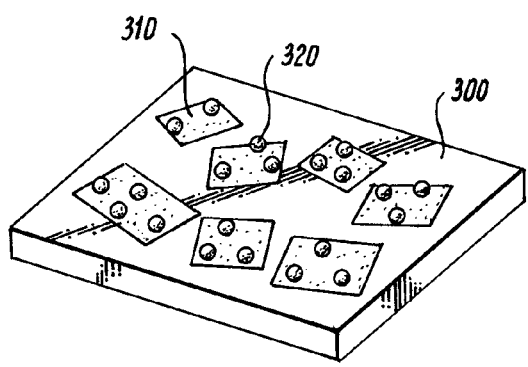
Figure 3D:
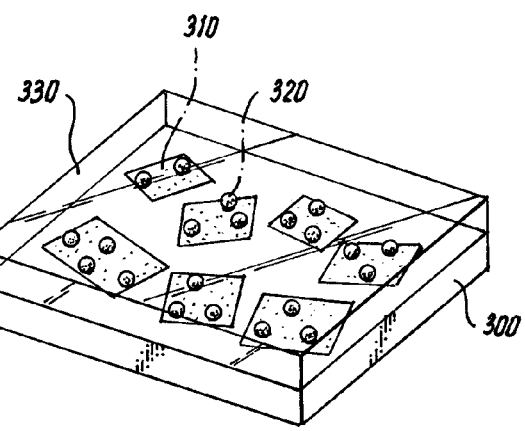

Once so formed, a layer of photoresist 330 is deposited on the intermediate structure shown in FIG. 3C to yield the intermediate structure shown in FIG. 3D. The layer of photoresist 330 may, for example, comprise poly(methyl methacrylate) (PMMA), although several other equally suitable materials are also readily available. PMMA is a commonly used photoresist material for electron beam photolithography in semiconductor fabrication, and may be obtained from several sources including MicroChem Corp. (Newton, Mass., USA). Deposition may also be by spray coating or dip coating, as well as by conventional photoresist spin coating. Once deposited, the layer of photoresist 330 is allowed to dry or is cross-linked by mild baking (e.g., about 100° C.). With the encapsulating films 310 and the active particles 320 now adhered to and/or incorporated into the layer of photoresist 330, the substrate 300 is then chemically etched away to produce the intermediate structure shown in FIG. 3E. Any solvent capable of selectively removing the substrate 300 without damaging the remaining layer of photoresist 330, the encapsulating films 310, and the active particles 320 may be utilized for the wet chemical etching. If the substrate 300 comprises copper and the layer of photoresist 330 comprises PMMA, the substrate 300 can be selectively removed by immersing the intermediate structure in FIG. 3D in a solution comprising, for example, ammonium persulfate or nitric acid. If, instead, the substrate 300 comprises nickel, a solution comprising, for example, nitric acid, hydrofluoric acid, sulfuric acid, or an acid/hydrogen-peroxide mixture may be utilized.

Figure 3E:
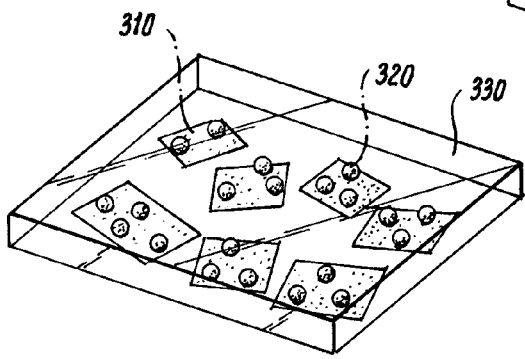
Figure 3F:
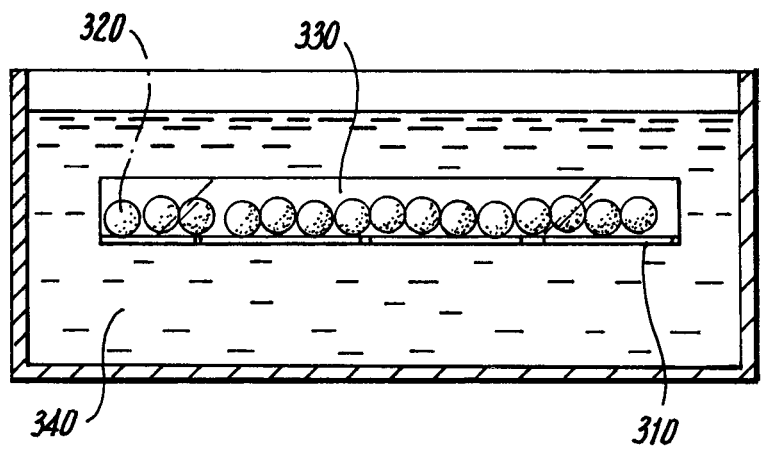
Figure 3G:
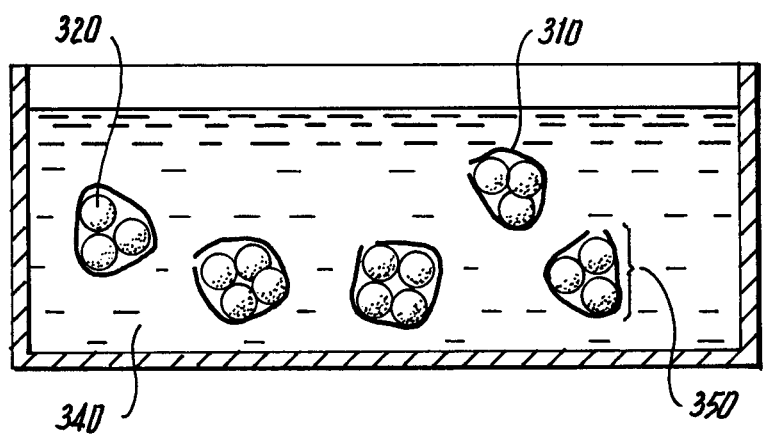

The intermediate structure shown in FIG. 3E is then also exposed to wet chemical etching by being immersed in a suitable solvent 340, as shown in FIG. 3F, to remove the layer of photoresist 330. The solvent may be any solvent which is capable of selectively removing the layer of photoresist 330 without harming the remaining encapsulating films 310 and active particles 320. If the layer of photoresist 330 comprises PMMA, one non-limiting example is acetone. The result of the stripping of the layer of photoresist 330 is shown in FIG. 3G (here again, with the frontal regions of the encapsulating films 310 made transparent to show the encapsulated active particles 320 within). Without the layer of photoresist 330 in place, surface tension effects take over and the active particles 320 form clusters that are each at least partially encapsulated by a respective one of the encapsulating films 310 Capsules 350 are thereby formed. Once so formed, the resultant capsules 350 may then be harvested from the solvent 340 by centrifugation, washing (e.g., in acetone and water), and drying under vacuum. Alternatively, the liquid solvent can be extracted by supercritical drying such as freeze drying or spray drying to harvest the capsules 350. To prepare the exemplary composite electrode 200, the capsules 350 are then mixed with the binder 230. The resultant product is like that shown in FIG. 2.

Figure 4:
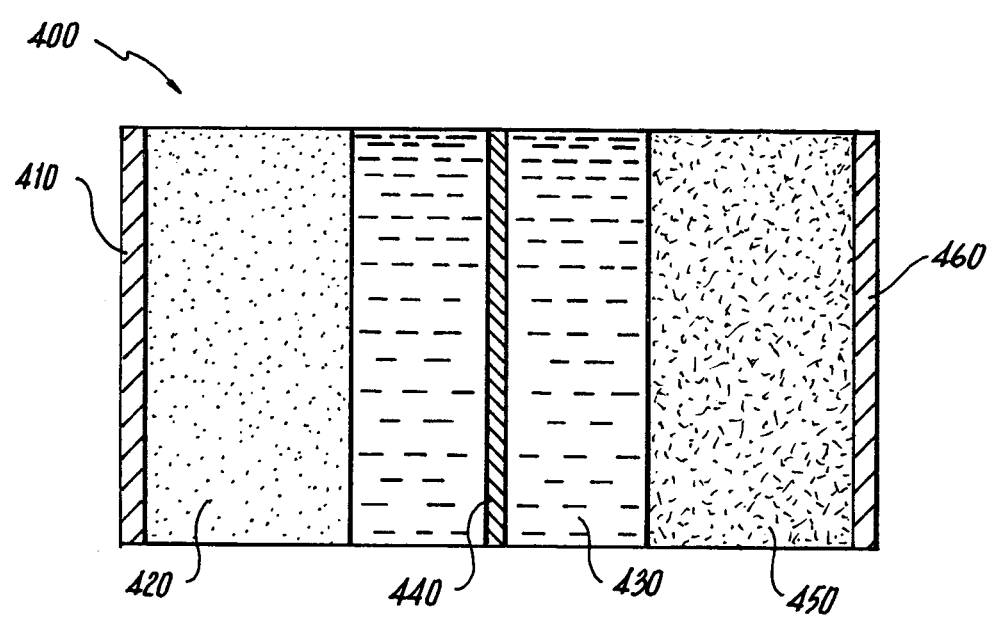
FIG. 4 shows a sectional view of a battery in which the FIG. 2 composite electrode may be utilized.

Composite electrodes in accordance with aspects of the invention like the composite electrode 200 may be utilized in energy storage devices such as lithium-ion batteries and supercapacitors (also frequently called "ultracapacitors" and "supercondensers," and including "electrochemical double-layer capacitors" (EDLCs) and "pseudocapacitors"). FIG. 4 shows a sectional view of a lithium-ion battery 400 in accordance with an illustrative embodiment of the invention in which the composite electrode 200 may be utilized. The lithium-ion battery 400 includes a positive current collector 410, a cathode 420, an electrolyte 430, a separator 440, an anode 450, and a negative current collector 460. Lithium-ion batteries (without novel composite electrodes like the composite electrode 200) are widely manufactured and are generally described in several references, including K. Ozawa, *Lithium Ion Rechargeable Batteries*, John Wiley & Sons, 2012, which is hereby incorporated by reference herein.

The composite electrode 200 may variously form the cathode 420 and the anode 450 in the lithium-ion battery 400. In one non-limiting illustrative embodiment, for example, the composite electrode 200 forms the anode 450 and includes active particles 220 comprising an electrochemically active metal (e.g., Si, Ge, Sn), a transition metal oxide (e.g., $SnO_2$, $Fe_xO_y$, $MnO_2$), or a conducting polymeric material (e.g., PANi, PPy, PEDOT). The cathode 420 consists of an intercalation material (e.g., $LiFePO_4$, $LiMnPO_4$, $LiCoO_2$, $LiMn_2O_4$, $LiNiO_2$, $Li(Li_aNi_bMn_cCo_d)O_2$)), a polymeric binder, and conducting carbon black or graphite. In another illustrative embodiment, the composite electrode 200 instead forms the cathode 420 and includes active particles 220 comprising an intercalation material, while the anode 450 consists of graphite flakes, a polymeric binder, and conducting carbon black. Finally, in a last illustrative embodiment, the composite electrode 200 forms both the cathode 420 and the anode 450. The cathode 420 contains active particles 220 comprising an intercalation material, while the anode 450 includes active particles 220 comprising an electrochemically active metal, a transition metal oxide, a conducting polymer, or carbon.

In any one of these variations of the lithium-ion battery 400, the positive current collector 410 may comprise, for example, aluminum (Al), while the negative current collector 460 may comprise, for example, copper (Cu). The separator 440 may be a microporous membrane that may be made from polyolefins, including, but not limited to, polyethylene, polypropylene, and polymethylpentene. Such separators are commercially available from sources such as Celgard LLC, (Charlotte, N.C., USA). The electrolyte 430 may consist of a lithium metal salt solvated in an appropriate solvent. Typical electrolytes include a lithium salt such as lithium hexafluorophosphate ($LiPF_6$), lithium tetrafluoroborate ($LiBF_4$), and lithium perchlorate ($LiClO_4$) in an organic solvent such as ethylene carbonate, dimethyl carbonate, and diethyl carbonate.

A supercapacitor has a structure similar to the lithium-ion battery 400 illustrated in FIG. 4, and therefore is not separately illustrated herein. Supercapacitors (without novel composite electrodes like the composite electrode 200) are widely manufactured and are generally described in several references, including B. E. Conway, *Electrochemical Supercapacitors: Scientific Fundamentals and Technological Applications*, Springer, 1999, which is hereby incorporated by reference herein. In one non-limiting embodiment of a supercapacitor, the composite electrode 200 forms the cathode 420 and includes active particles 220 comprising intercalation materials. The anode 450 consists of activated carbon, polymeric binders, and conducting carbon black or graphite.

The unique physical and electrical characteristics of the composite electrode 200 shown in FIG. 2 and, more generally, composite electrodes in accordance with aspects of the invention, impart several advantages to energy storage devices in which those composite electrodes are implemented. The encapsulating films 210 in the composite electrode 200, for example, confine the active particles 220 within a compressive "shell" and, in so doing, allow the active particles 220 to see repeated lithium ion insertion/extraction cycles without the active particles 220 becoming detached, fragmented, or pulverized. In so doing, unwanted side reactions between the active particles 220 and the electrolyte are avoided. In fact, in one or more embodiments of the invention, the lateral size of the encapsulating films 210 can be tailored (by, for example, varying CVD deposition parameters) to ensure efficient covering of the active particles 220, leading to an enhanced tolerance to structural distortion and therefore improved cyclability.

Figure 5A:
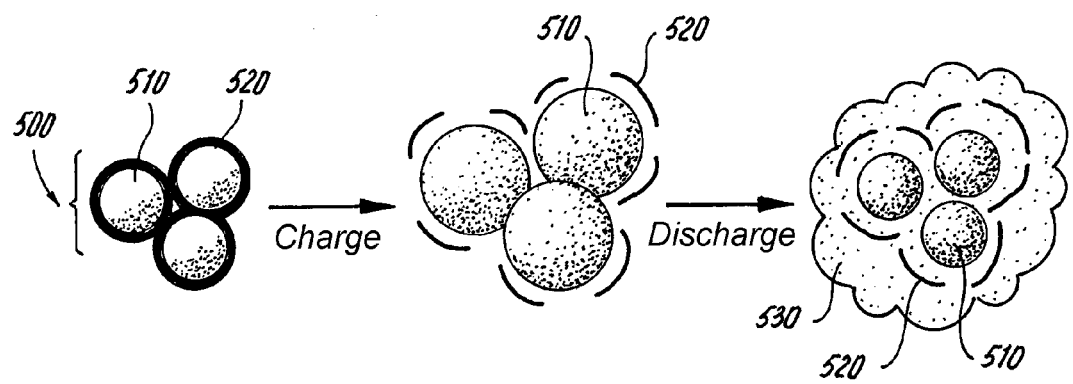
FIGS. 5A and 5B show diagrammatic representations that compare the charging and discharging of two different types of composite electrodes.
Figure 5B:
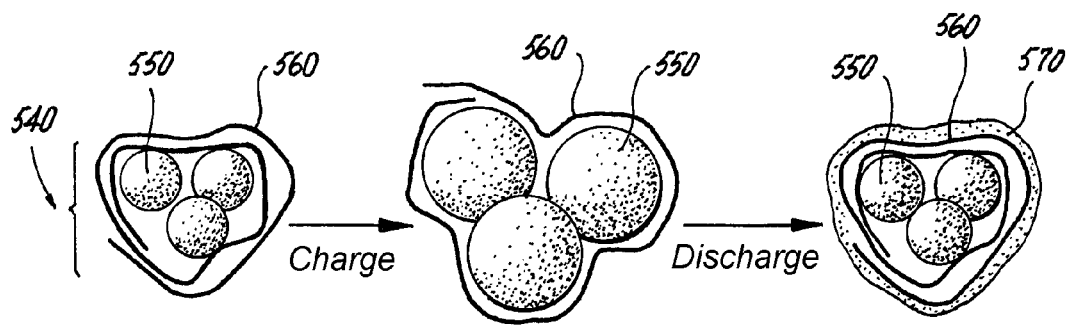

FIGS. 5A and 5B show diagrammatic representations that compare the effect of charging (i.e, lithiation) and discharging (de-lithiation) of conformally coated active particles 500 (FIG. 5A) with a capsule 540 in accordance with an embodiment of the present invention like one of the capsules 240 shown in FIG. 2 (FIG. 5B). In both figures, the frontal regions of the respective encapsulating films are again made transparent to expose the encapsulated active particles within.

Each of the conformally coated active particles 500 in FIG. 5A include, before charging and discharging, a respective active particle 510 with a conformal coating 520 (e.g., carbon). As can be seen in the figure, charging and discharging the active particles 510 causes the active particles 510 to substantially expand and thereby create gaps in the conformal coating 520 that expose the active particles 510 to unwanted side reactions. The active particles 510 may thereby become isolated and lose electrical contact due to deposition of side products 530, depleting the available electrolyte and severely hindering the rate capability and deep cycling ability of the electrodes. In contrast, in the embodiment of the invention shown in FIG. 5B, the capsule 540 comprises active particles 550 forming a cluster that is encapsulated by an encapsulating film 560 (e.g., graphene). The encapsulating film 560 in this case is rather large to accommodate substantial expansion during charging. Notably, the continuous encapsulating shell accommodates expansion and contraction during charging/discharging while continuing to protect the cluster of active particles 510 from deposition and isolation resulting from side products 570.

As even another advantage, capsules in accordance with aspects of the invention, like the capsules 240 in FIG. 2, display high compressive strength, and, when implemented in an electrode like the composite electrode 200, can pack tightly without reducing the accessible surface area or collapsing the open channels for electrolyte entry. This, in turn, improves the volumetric energy density and high-rate performance of these electrodes.

Lastly, as even another advantage, capsules in accordance with aspects of the invention, like the capsules 240 in the composite electrode 200, can be formed without the need to thermally or chemically reduce graphene oxide (GO). As a result, the resultant graphene encapsulating films have low defect densities and very high electrical conductivities. When closely collected as they are in, for example, the composite electrode 200, the capsules can thereby form a percolating pathway for electron transfer, yielding a low internal resistance throughout the electrodes and further improved rate capability even as a minor fractional component.

It should again be emphasized that the above-described embodiments of the invention are intended to be illustrative only. Other embodiments can use different processing steps, and different types and arrangements of elements to implement the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in 35 U.S.C.§112, ¶6. In particular, the use of "step of" in the claims herein is not intended to invoke the provisions of 35 U.S.C.§112, ¶6.

What is claimed is:

1. A method comprising the steps of:
    forming an encapsulating film on a substrate, the encapsulating film comprising graphene;
    depositing a plurality of particles on the encapsulating film;
    depositing a temporary layer on the plurality of particles and the encapsulating film;
    removing the substrate; and
    removing the temporary layer so as to cause the plurality of particles to form a cluster that is at least partially encapsulated by the encapsulating film.

2. The method of claim 1, wherein the step of forming the encapsulating film comprises chemical vapor deposition.

3. The method of claim 2, wherein the chemical vapor deposition is accomplished at least in part with methane and hydrogen.

4. The method of claim 1, wherein the method does not comprise reducing graphene oxide.

5. The method of claim 1, wherein the substrate comprises at least one of copper and nickel.

6. The method of claim 1, wherein the plurality of particles comprise at least one of silicon, germanium, and tin.

7. The method of claim 1, wherein the plurality of particles comprise a transition metal oxide.

8. The method of claim 1, wherein the plurality of particles comprise at least one of a lithium metal phosphate and a lithium metal oxide.

9. The method of claim 1, wherein the plurality of particles comprise a conductive polymer.

10. The method of claim 1, wherein the plurality of particles have an average diameter between about ten nanometers and about ten micrometers.

11. The method of claim 1, wherein the step of depositing the plurality of particles comprises at least one of spray coating and dip coating.

12. The method of claim 1, wherein the temporary layer comprises a polymeric material.

13. The method of claim 1, wherein the temporary layer comprises a polymeric photoresist material.

14. The method of claim 1, wherein the step of depositing the temporary layer comprises at least one of spray coating, dip coating, and spin coating.

15. The method of claim 1, wherein the step of removing the substrate comprises wet chemical etching.

16. The method of claim 1, wherein the step of removing the temporary layer comprises wet chemical etching.

17. The method of claim 1, wherein the step of removing the temporary layer comprises at least one of centrifugation and supercritical drying.

18. The method of claim 1, further comprising the step of installing the cluster that is at least partially encapsulated by the encapsulating film into an energy storage device.

19. The method of claim 18, wherein the energy storage device comprises a battery.

20. The method of claim 19, wherein the battery comprises a lithium-ion battery.

21. The method of claim 18, wherein the energy storage device comprises a supercapacitor.

* * * * *